US008618465B2

(12) United States Patent
Tevs et al.

(10) Patent No.: US 8,618,465 B2
(45) Date of Patent: Dec. 31, 2013

(54) SEED SENSOR SYSTEM AND METHOD FOR IMPROVED SEED COUNT AND SEED SPACING (75) Inventors: Nikolai R. Tevs, Fargo, ND (US); James Z. Liu, Belvidere, IL (US); Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 170 days.

(21) Appl. No.: 13/218,000

(22) Filed: Aug. 25, 2011

(65) Prior Publication Data
US 2011/0303137 A1   Dec. 15, 2011

Related U.S. Application Data (63) Continuation-in-part of application No. 12/270,317, filed on Nov. 13, 2008, now abandoned.

(51) Int. Cl.
*A01C 7/00* (2006.01)
*G01V 8/00* (2006.01)

(52) U.S. Cl.
USPC ............. 250/222.2; 250/222.1; 111/200; 111/900; 377/6; 377/53

(58) Field of Classification Search
USPC ............ 250/221, 222.1, 222.2, 223 R, 206.1, 250/206.2; 377/6, 10, 12, 53; 111/200, 900, 111/903
See application file for complete search history.

(56) References Cited

U.S. PATENT DOCUMENTS

| | | | |
|---|---|---|---|
| 4,635,215 A | 1/1987 | Friend | |
| 4,675,520 A | 6/1987 | Harrsen et al. | |
| 5,204,160 A | 4/1993 | Rouser | |
| 5,533,458 A | 7/1996 | Bergland et al. | |
| 5,650,609 A | 7/1997 | Mertins et al. | |
| 5,936,234 A | 8/1999 | Thomas et al. | |
| 6,386,128 B1 | 5/2002 | Svoboda et al. | |
| 6,398,370 B1 | 6/2002 | Chiu et al. | |
| 7,472,660 B2 | 1/2009 | Mariman et al. | |
| 2005/0028713 A1 | 2/2005 | McCartney | |
| 2005/0226465 A1* | 10/2005 | Fujita et al. | 382/110 |
| 2010/0192819 A1 | 8/2010 | Garner et al. | |

OTHER PUBLICATIONS

M.F. Kocher, Y. Lan. c. chen, J.A, Smith. 1998. Opto-Electronic Sensor System for Rapid Evaluation of Planter Seed Spacing Uniformity. Transactions of the ASAE 41(1):237-245.

* cited by examiner

*Primary Examiner* — Kevin Pyo (57) ABSTRACT

A seed sensor system determines the position of the seed relative to the seed tube as the seed passes the sensor. The position of the seed as well as the speed of the planter and the position of the seed tube above the planting furrow are used to calculate trajectory of the seed into the furrow from which the seed spacing is predicated. By sensing the seed in both X and Y directions in the seed tube, the sensor is better able to determine multiple seeds as well providing more precision to the seed population.

12 Claims, 10 Drawing Sheets

SEED SENSOR SYSTEM AND METHOD FOR IMPROVED SEED COUNT AND SEED SPACING

CROSS-REFERENCE TO RELATED APPLICATIONS

This application is a continuation-in-part of application Ser. No. 12/270,317, filed Nov. 13, 2008 now abandoned.

FIELD

The invention pertains to agricultural planters and in particular to an improved sensor system for determining seed count and seed spacing.

BACKGROUND

It is well known in the agriculture to use a monitor on planters to monitor the seed at each row unit. When first employed, monitors were used to alert the operator of a plugged row unit or a unit without any seed to avoid continued operation of the planter without actually planting seed. More recently, studies have quantified the importance of accurate seed spacing in producing enhanced crop yields. As a result, monitor technology has advanced in efforts to determine seed spacing. Current monitors use the time interval between seeds to determine skips or multiples of seed. These monitors also predict seed spacing in the furrow based on the timing of seed passing the monitor in the seed tube.

A paper entitled Opto-electronic Sensor System for Rapid Evaluation of Planter Seed Spacing Uniformity, Transactions of the ASAE 41(1):237-245 describes using the seed trajectory, speed of the planter and timing of seed release events to determine seed spacing. The goal of the study was to evaluate a sensor located just above the soil surface at the seed drop zone in measuring the seed location relative to the planter. The sensor was then used to determine seed spacing instead of dropping seed onto a grease belt and manually evaluating seed spacing. The sensor had two arrays of 12 pairs of LEDs and photo-transistors to sense and locate the seed along one axis.

SUMMARY

A sensor system is provided with higher sensitivity to seed counting, reduced errors for skips, doubles (intentional double, triples or unintentional); better dust immunity that enables the sensor to be moved closer to the ground, which is desired for closer to true in ground information; improved capability for higher rate seed monitoring, etc. The present invention provides a sensor system that uses the seed location relative to the planter as the seed passes through the seed tube, along with other parameters, to determine the seed spacing in the furrow. The sensor system of the present invention uses a sensor that not only counts the seed but determines the position of the seed relative to the seed tube in the direction of travel of the planter. From the position information, a trajectory is determined of the seed falling through the seed tube. Travel speed of the planter and the timing of the seed passing the monitor are other necessary factors in determining the seed trajectory. The trajectory then enables the seed spacing to be predicted with a higher degree of accuracy then is possible with sensors that only determine the interval of time between seed drop events.

Other parameters that further improve the accuracy of determining the seed spacing include acceleration of the planter row unit and the down force applied to the row unit. The acceleration of the row unit effects the initial direction of travel of the seed as the seed is released from the meter. The down force on the row unit effects the location of the seed tube exit relative to the furrow.

DETAILED DESCRIPTION

Figure 1:
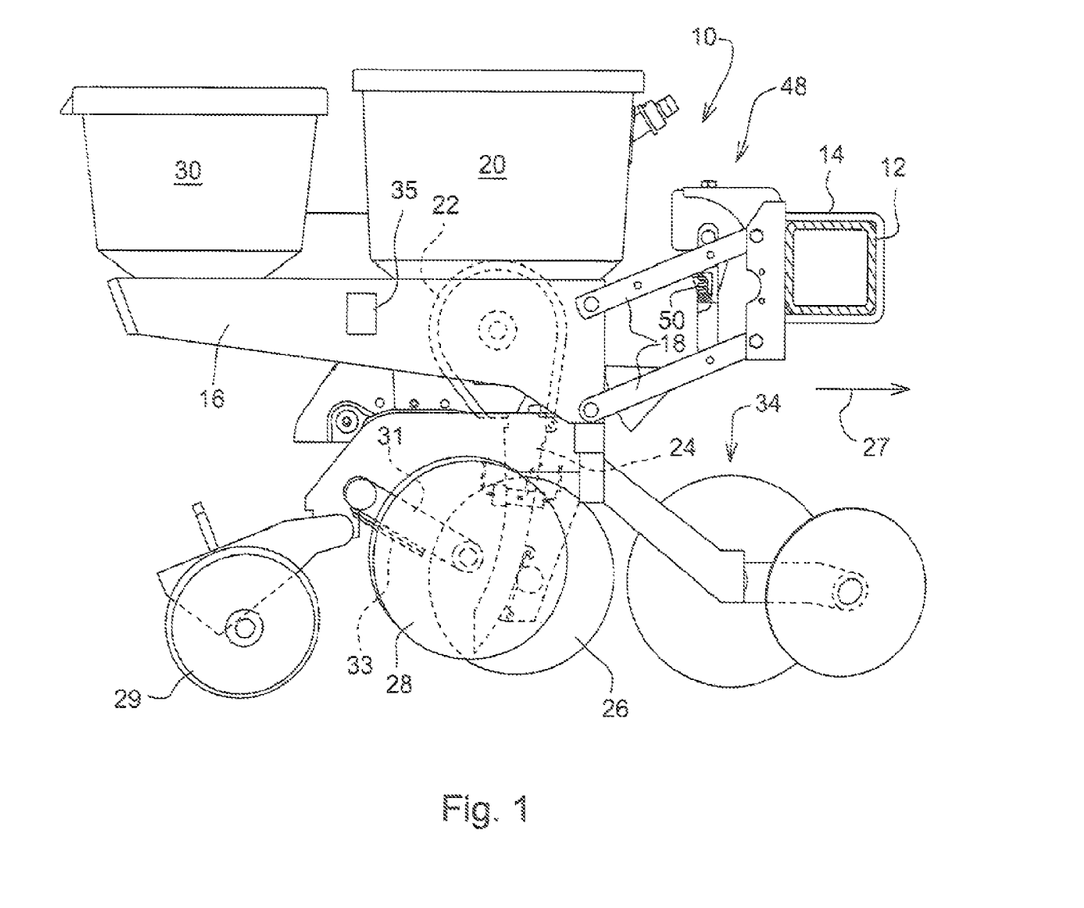
FIG. 1 is a side view of a planting unit.

FIG. 1 is a side view of a planting unit 10 equipped with the sensor system described herein. The planting unit 10 is mounted to rectangular toolbar 12 by U-bolts 14. The planting unit 10 is provided with a frame 16 having a parallelogram linkage 18 for coupling the planting unit 10 to the toolbar 12 to allow up and down relative movement between the unit 10 and toolbar 12. Seed is stored in seed hopper 20 and provided to seed meter 22. From the seed meter 22 the seed is dropped through the seed tube 24 into a planting furrow formed in the soil by furrow openers 26. Gauge wheels 28 control the depth of the furrow and closing wheels 29 close the furrow over the seed. The gauge wheels 28 are mounted to the frame 16 by arms 31. A down force sensor 33 is coupled to one arm 31 and includes a strain gage for measuring the amount of force applied to the gauge wheel by the ground. An accelerometer 35 is mounted to the frame 16 and can be placed at any convenient location thereon. The toolbar and planting unit are designed to be move over the ground in a forward working direction X identified by the arrow 27.

Pesticides can be stored in a chemical hopper 30 which is mounted to the planting unit frame 16. This particular planting unit is provided at the front with a row cleaner attachment 34. A mechanical down force generator 48 is attached to the toolbar 12 and includes springs 50 to generate a down force applied to the linkage 18. The particular down force generator 48 shown is adjustable. Any type of down force generator can be used, fixed force, adjustable force, mechanical, hydraulic, pneumatic, etc. The planting unit 10 is shown as an example of the environment in which the present invention is used. The present invention can be used in any of a variety of planting units.

Figure 2:
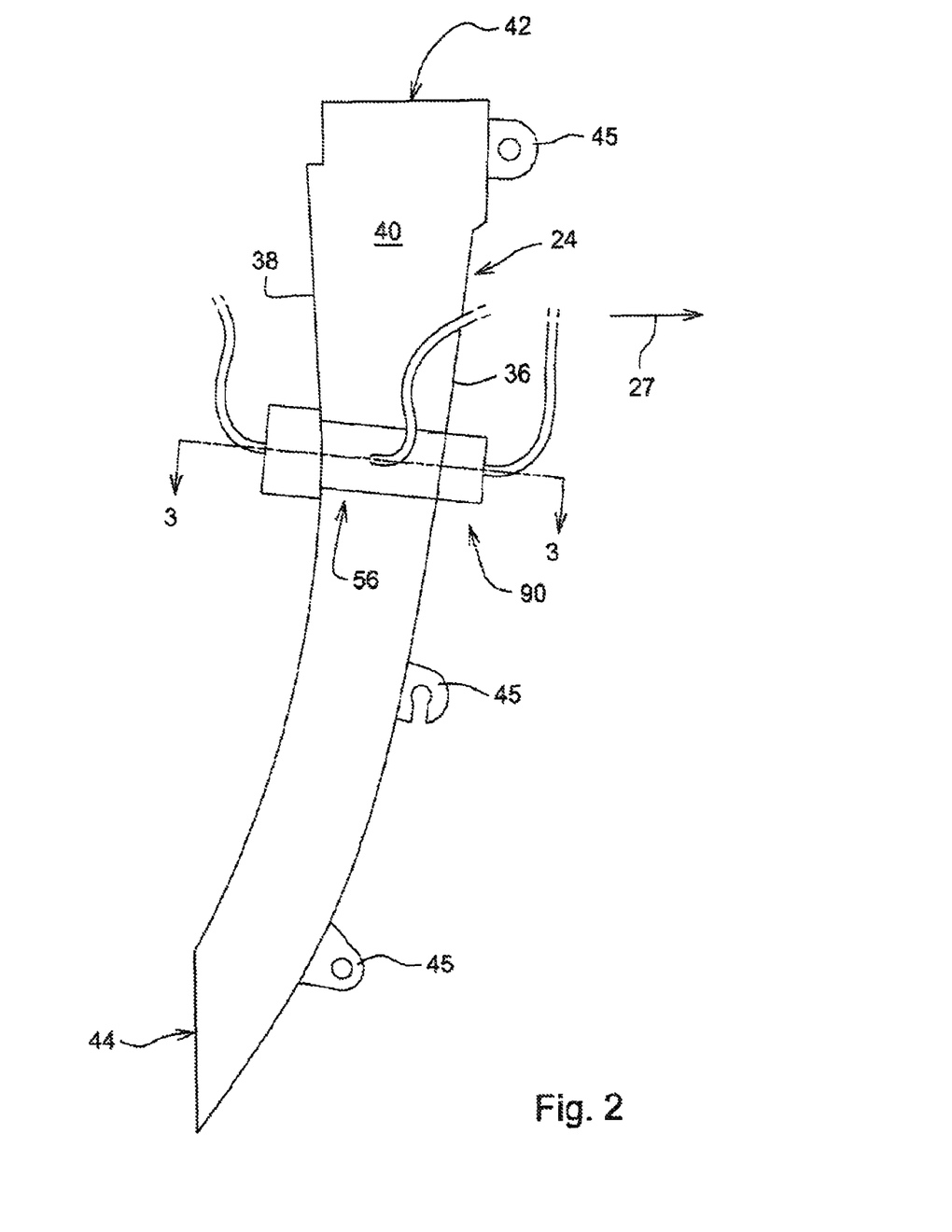
FIG. 2 is a side view of the seed tube of the planting unit show in FIG. 1.

The seed tube 24, shown in FIGS. 1 and 2, is provided with a curved forward wall 36, a curved rear wall 38 and two sidewalls 40 joining the front and rear walls 36 and 38. The forward and rear walls are curved rearwardly and downwardly. The tube has an open top 42 and an open bottom 44. The exterior of front wall is also provided with tangs 45 for mounting the seed tube to the planting unit frame 16.

Figure 3:
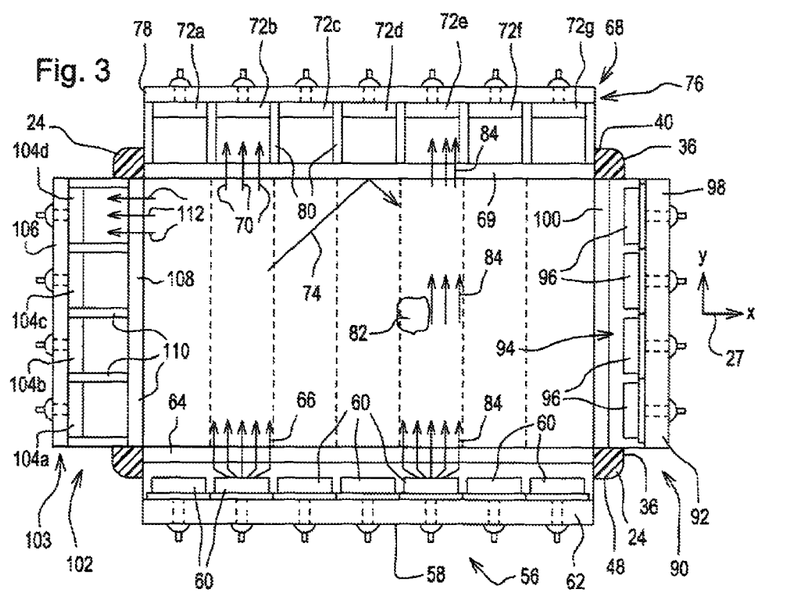
FIG. 3 is a sectional view of the seed tube as seen from substantially the line 3-3 of FIG. 2.
Figure 4:
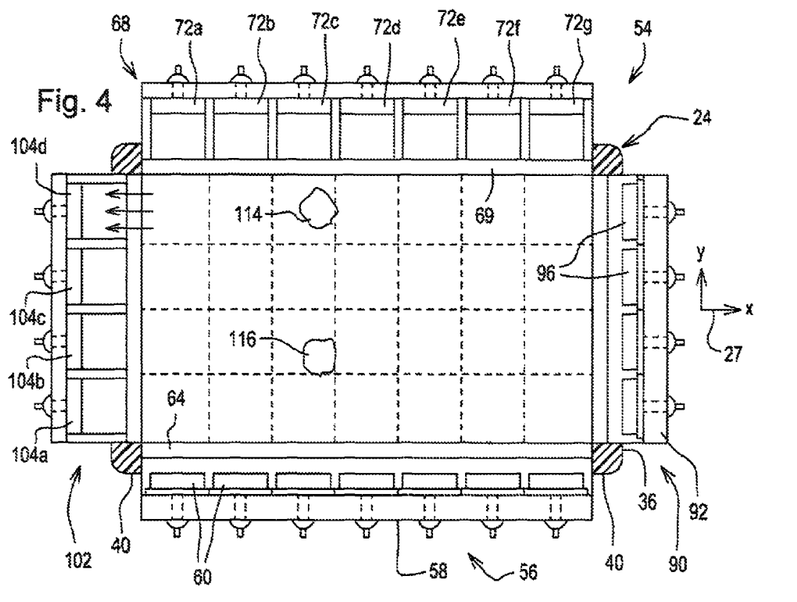
FIG. 4 is another a sectional view of the seed tube as seen from substantially the line 3-3 of FIG. 2.

With reference to FIG. 2-4, seed tube 24 is equipped with a first sensor assembly 56 mounted to the side walls 40 of the seed tube at apertures therein. The sensor assembly 56 includes a radiation emitter 58, shown as an array of light emitting diodes (LEDs) 60 on one side wall 40 of the seed tube. The LEDs are mounted to a PC board 62 with conductive strips forming electrical connections with the LEDs 60 mounted thereon.

Positioned in front of the LEDs and preferably flush with the inner edge of the seed tube side wall is a lens 64 which directs the light emitted by the LEDs into parallel beams substantially in the Y-direction as shown by the arrows 66. One type of lens can be a privacy filter such as that made by the 3M Company and of the type described in U.S. Pat. No. 6,398,370. Any number of LEDs can be used in the emitter 58 as long as the emitters and lens 64, in combination, produce beams of radiation in the Y direction across substantially the entire width of the side wall 40. The sensor assembly 56 further includes a radiation detector 68 mounted to the opposite side wall 40 of the seed tube. A lens 69 is flush with the inside surface of the seed tube side wall 40 and will transmit radiation substantially in the Y-direction as shown by arrows 70. Radiation detecting elements 72*a-g* are arranged in an array 76. Elements 72 can be photo-diodes or photo-transistors or other detector capable of detecting the radiation from the radiation emitter 58. The detecting elements 72 are also mounted on a PC board 78 with conductive strips forming electrical connections. The lens 69 ensures that radiation received by the radiation detecting elements 72 are traveling substantially in the Y-direction. Radiation not traveling in the Y-direction, such as shown by arrow 74, is blocked or reflected by the lens 69. Each of the detecting elements 72 are separated from one another by divider walls 80 extending between the lens 69 and the detector elements 72. The divider walls further help to ensure that the detecting elements 72 receive radiation traveling substantially in the Y-direction.

When a seed 82 falls through the seed tube between the radiation emitter 58 and the array of radiation detecting elements 72, there will be an interruption in the radiation incident upon one or more of the detectors 72. In other words, the seed will momentarily block the radiation traveling across the seed tube. As shown in FIG. 3 with the seed 82, only the detector 72*e* will experience the interruption in radiation incident thereon as shown by the arrows 84. This not only indicates that a seed has passed, but also indicates the location of the seed in the X-direction relative to the front and rear walls of the seed tube. The output from the detecting elements 72 is transmitted from the array to a processing unit 86 (FIG. 12) through wires (not shown). Wireless communication is also possible.

A second sensor assembly 90 is mounted to the seed tube front and rear walls 36, 38. The second sensor assembly 90 is of substantially the same construction as the first sensor assembly 56. Second sensor assembly 90 includes a radiation emitter 92 mounted to the front wall 36 of the seed tube 24. The emitter 92 is in the form of an array 94 of LEDs 96 mounted to a PC board 98. LEDs 96 are covered by a lens 100 to direct radiation in substantially the X-direction. The lens 100 is flush with the interior surface of the front wall 36. Sensor assembly 90 further includes a radiation detector 102 in the form of an array 103 of radiation detecting elements 104*a-d* on the rear wall 38, opposite the radiation emitter 92. The detecting elements 104*a-d* are similarly mounted on a PC board 106 with conductive strips forming electrical connections. The detecting elements are positioned behind a lens 108 that limits radiation passing therethrough to travel in substantially the X-direction as shown by the arrows 112. Each of the detecting elements 104 are separated from one another by divider walls 110 extending between the lens 108 and the detector elements 104. The divider walls further help to ensure that the detecting elements 72 receive radiation traveling in the X-direction. While the radiation emitter 92 is shown mounted on the front wall of the seed tube and the detector 102 is shown mounted on the rear wall, they can be reversed without effecting the functioning of the second sensor assembly 90. The second sensor assembly provides the location in the Y-direction of the seed passing through the tube. Ideally, the second sensor assembly 90 is positioned to sense along the same plane as the first sensor assembly 56. However, the two sensor assemblies 56, 90 can be located in different planes and the difference accounted for in the processing algorithm.

As shown in FIG. 4, the first and second sensor assemblies 56, 90 cooperate to divide the interior passage of the seed tube into a grid. By sensing the seed in one section of the grid or in two adjacent sections, the X and Y position of the seed is determined. By determining the seed location in both the X and Y directions, multiples of seed can be readily detected. For example, in FIG. 4 seeds 114 and 116 are both being sensed by the same radiation detecting element 72*c* of the detector 68 and therefore assigned the same location in the X direction. With only the first sensor assembly 56, seeds 114, 116 would be counted as a single seed. The use of both sensor assemblies 56 and 90, the X and Y positions of the seeds is determined and both radiation detectors 104*b* and 104*d* will detect a seed, indicating two seeds, not one passing the sensors. The use of two sensors thus provides improved precision in counting seeds.

With continued reference to FIG. 3, when the seed 82 falls through the seed tube, it blocks a significant portion, approximately one half, of the radiation flowing across the seed tube and into the detector 72*e*. The portion of the normal radiation that is blocked with the sensor assembly 56 is much greater than the portion of radiation blocked in a conventional sensor that receives radiation across the entire width of the seed tube. As a result, the signal to noise ratio is much greater with the sensors in the present invention compared to prior sensors. This increased signal to noise ratio enables the sensor assemblies to better distinguish between seeds and dust. This in turn, allows the sensor assembly to be located closer to the seed tube outlet compared to other currently available seed sensors where there is more dust. The closer proximity to the furrow allows greater precision in determining seed spacing.

Figure 5A:
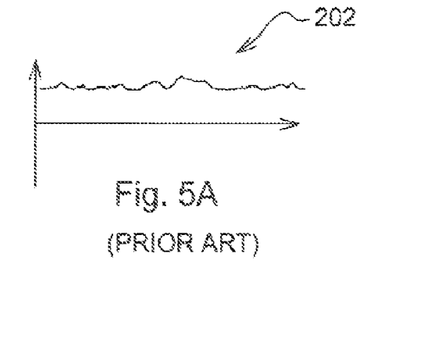
FIG. 5A is an example of the output signal from prior sensor showing background dust noise.
Figure 5B:
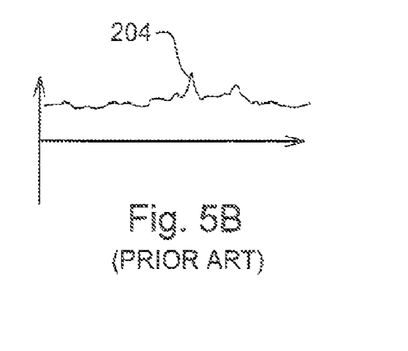
FIG. 5B is an example of the output signal from prior sensor showing, like FIG. 5A with a seed passing the sensor.
Figures 6A, 6B:
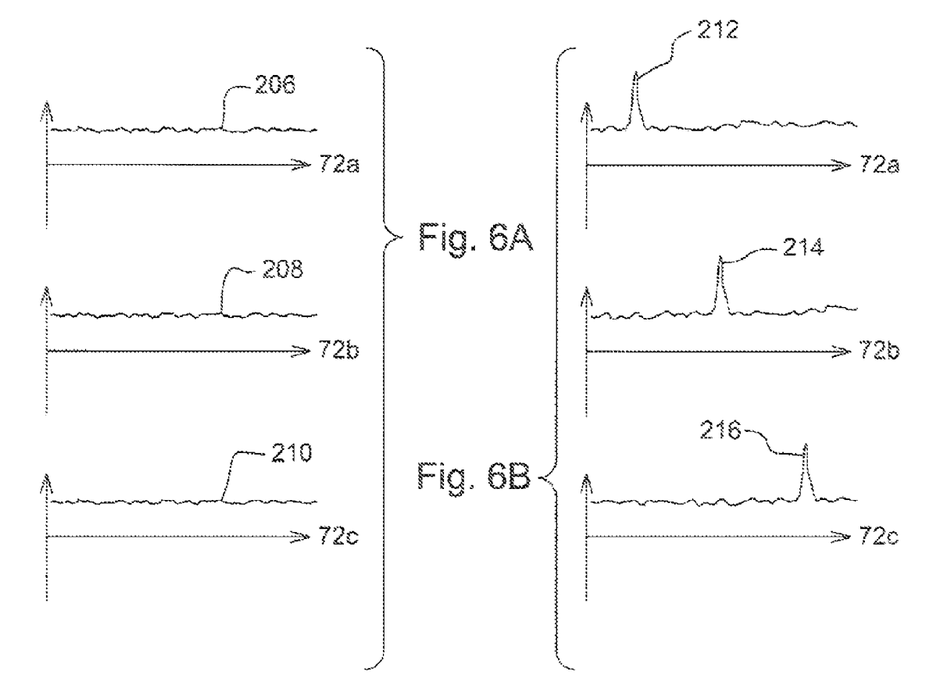
FIG. 6A is an example of the output signal form the current sensor showing background dust noise.
FIG. 6B is an example of the output signal from the current sensor showing, like FIG. 6A with a seeds passing the sensor.

With reference to FIGS. 5a and 5b, the dust noise signal and a passing seed is illustrated. FIG. 5a shows the signal 202 generated by dust in the seed tube. FIG. 5b shows the passing of a seed and the peak 204 in the signal generated by the seed. The peak 204 is relatively small from the dust signal 202 and can be easily missed by the signal processing algorithm. In contrast, FIGS. 6a and 6b show the signals from three of the radiation detectors 72. FIG. 6a shows the signals 206, 208 and 210 generated by dust. This represents background noise. FIG. 6b shows the peaks 212, 214, 216 generated by seeds passing the detectors. Since the seed blocks a larger percentage of the radiation incident upon the detectors, the seed generated peaks in the signal are much larger than the baseline dust noise and are easier to distinguish from the noise.

Figures 7, 8:
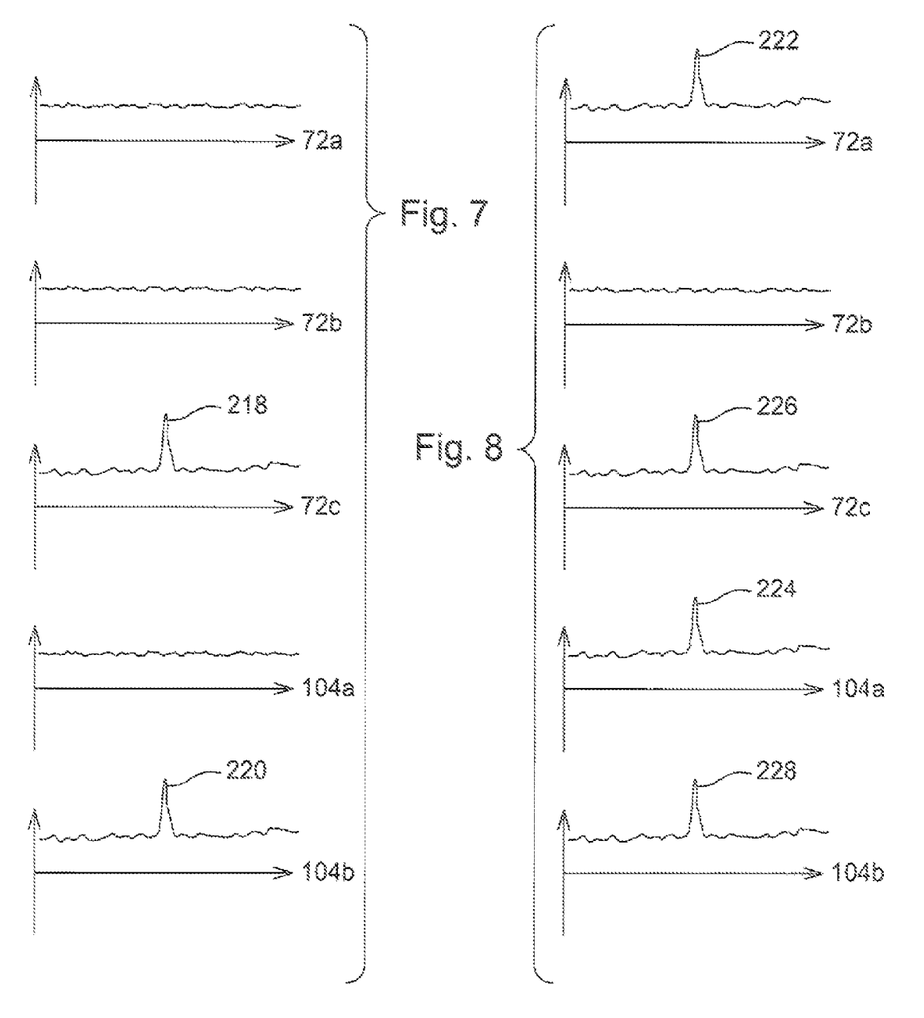
FIG. 7 is an example of the output signal from the current sensor showing a seed passing and being detected in both the X and Y directions.
FIG. 8 is similar to FIG. 7 with two seeds being detected in both the X and Y directions.

FIG. 7 shows a single seed passing solely by detectors 72c and 104b. Peaks 218 and 220 are generated in the detector signals while the other detectors, 72a and B and 104a have no peaks in their signals. FIG. 8 shows two seeds passing through the sensor assemblies. One seed is sensed solely by detectors 72a and 104a generating peaks 222 and 224 in their output signals. The other seed is sensed by detectors 72c and 104b, generating peaks 226 and 228 in their output signals.

Figures 9, 10:
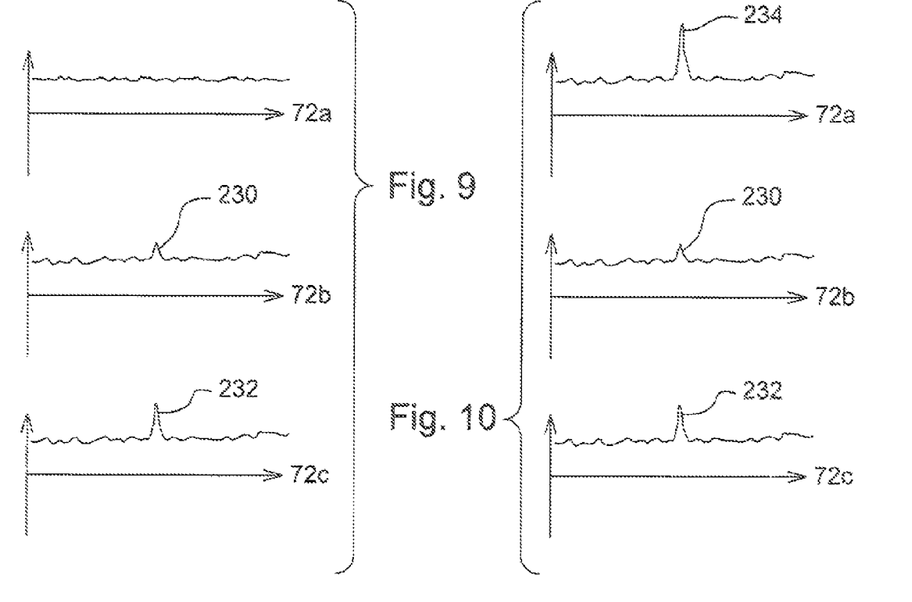
FIG. 9 is an example of the output signal from the current sensor showing a seed passing and being detected by two adjacent radiation detectors in the X direction.
FIG. 10 is similar to FIG. 9 showing a seed passing and being detected by two adjacent radiation detectors in the X direction and a second seed being detected solely by a third radiation detector in the X direction.

FIG. 9 shows one seed passing partially in front of adjacent detectors 72b and 72c but not in front of detector 72a. The signal from 72a continues to register the background noise. Signals from 72b and 72c have peaks 230 and 232 representing the seed but they are less then the peaks of FIG. 6b where the seed is sensed entirely by one detector. FIG. 10 is similar to FIG. 9 with one seed passing partial in front of detectors 72b and 72c but with another seed is passing in front of detector 72a, generating the peak 234.

Figures 11A, 11B:
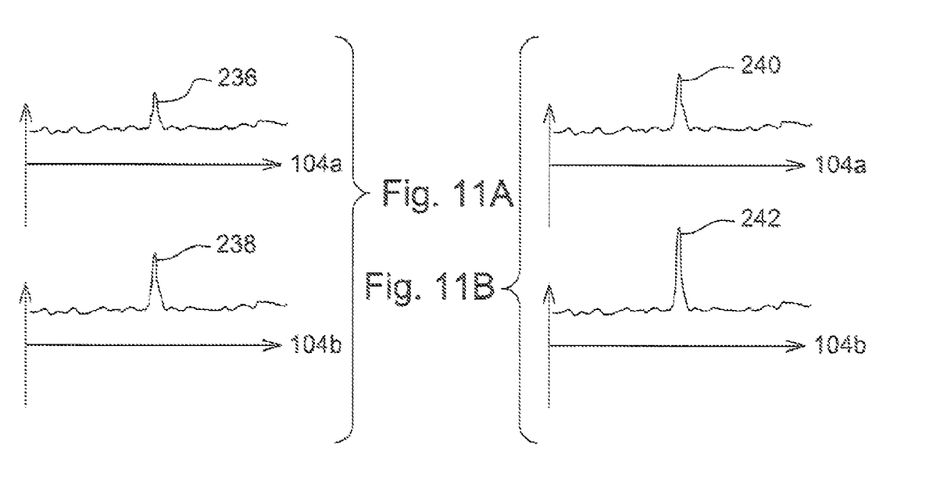
FIG. 11A is similar to FIG. 9 showing a seed passing and being detected by two adjacent radiation detectors in the Y direction.
FIG. 11B is like FIG. 11A but shows two seeds passing in the same position in the Y direction.

Similarly, FIG. 11a shows one seed partially passing both the detectors 104a and 104b. Like FIG. 9, shorter peaks 236 and 238 are generated. FIG. 11b in turn shows two seeds simultaneously passing the detectors 104a and 104b. As a result of the two seeds, the peaks 240 and 242 generated are larger than the single seed peaks of FIG. 11a.

Figure 12:
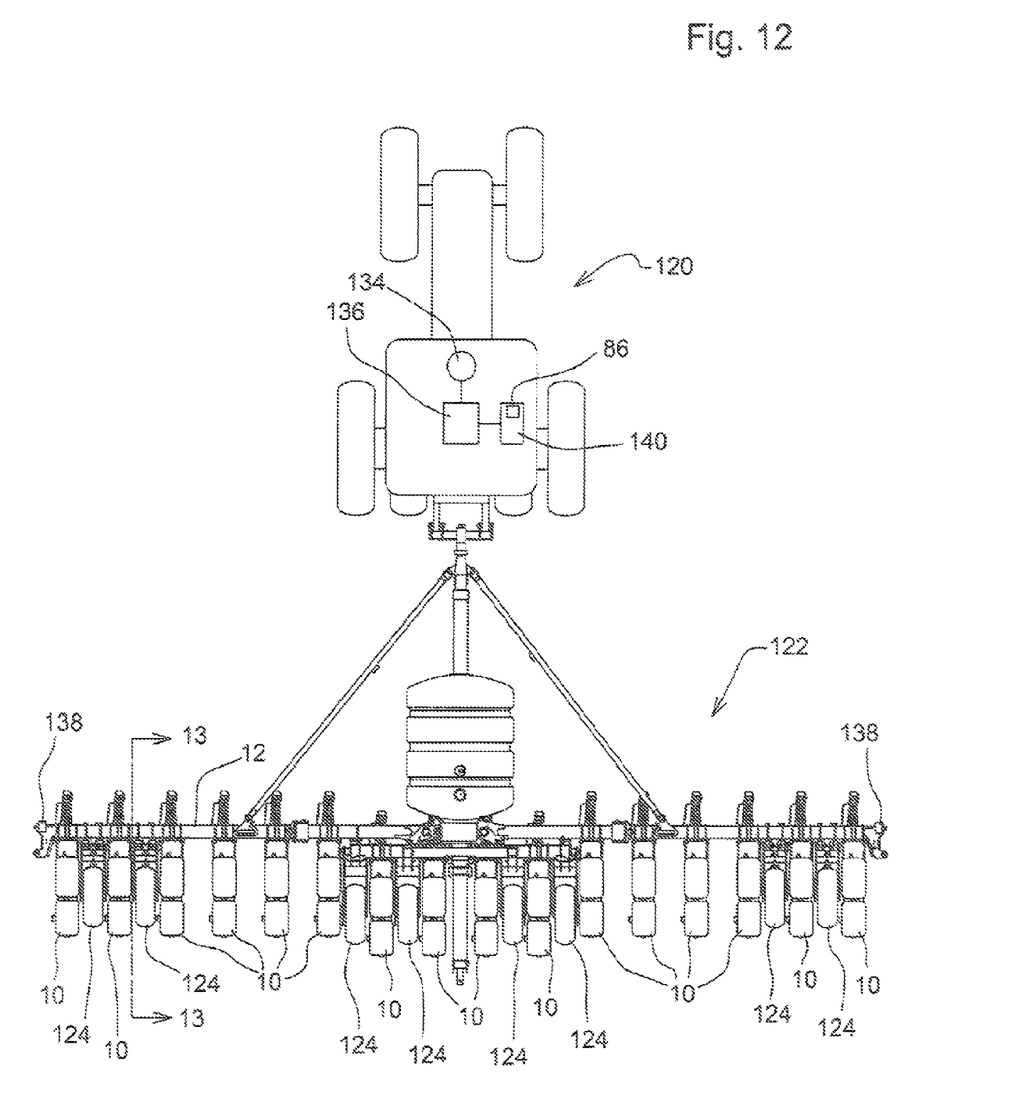
FIG. 12 is a plan view of a tractor and a planter with multiple planting units of FIG. 1.
Figure 13:
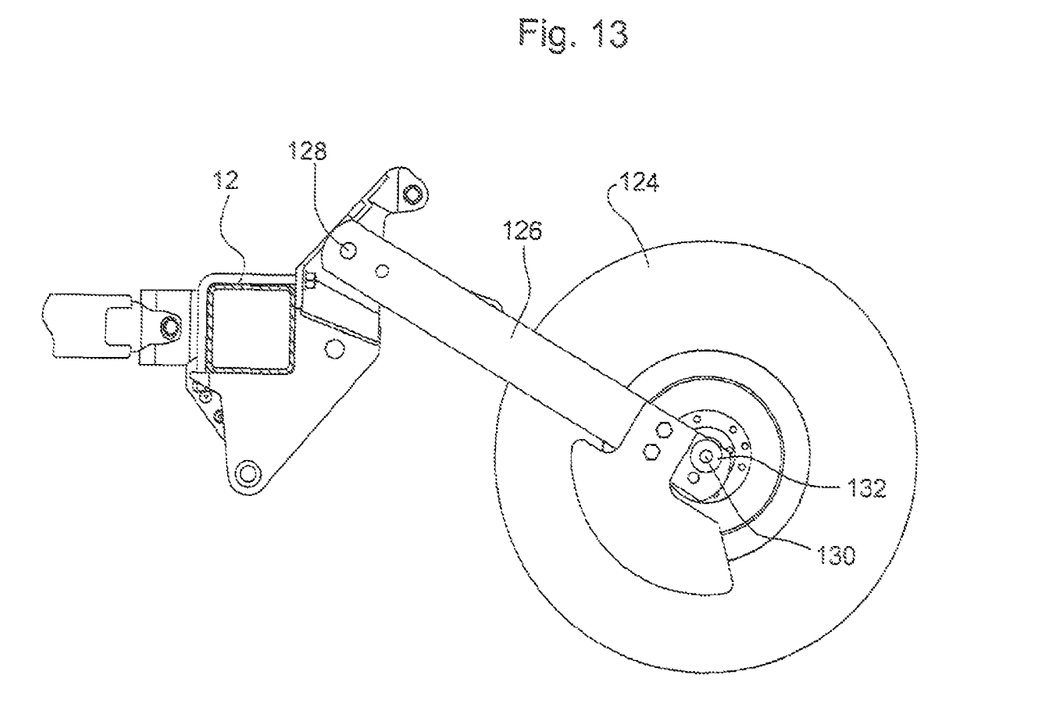
FIG. 13 is a side view of the planter as seen along the line 13-13 of FIG. 12.

With reference to FIG. 12, a Tractor 120 is shown towing a planter 122. The planter includes a toolbar 12 having a plurality of planting units 10 attached thereto. A number of support wheel and tire assemblies 124 are coupled to the toolbar for supporting the planter. Wheel and tire assemblies 124 are movable relative to the toolbar to raise and lower the toolbar between a working position in which the planter row units engage the ground and a raised transport position for moving the planter without engaging the ground. Pivot arms 126 (FIG. 13) carry the wheel and tire assemblies 124 and are in turn coupled to a pivot 128 mounted to the toolbar. A rotation sensor 130 at the hub 132 of one wheel and tire assembly is used to determine the speed of travel of the planter through a field. Alternatively, the tractor 120 is equipped with GPS receiver 134 and processor 136 from which the location, as well as the direction and speed of travel of the tractor and planter, can be determined. In yet another alternative, speed sensors, such as radar sensors 138 mounted to the toolbar can be used to determine the planter speed. Sensors 138 determine the speed by sensing the ground passing beneath the toolbar. While one sensor 138 is sufficient to determine the planter speed, having two sensors spaced apart along the length of the toolbar enables the speed of individual planter units 10 to be determined as the planter follows a contour path. Due to the curved path of the contour, the outside planter row unit moves at a faster speed than the inside planter row unit. Thus, the two sensors 138 are spaced as far apart as practical for greater precision in determining speed differences on a contour. Other types of speed sensors can be used as well.

A planter monitor 140 in the tractor has a processor 86 that receives input signals from the seed tube sensor assemblies 56 and 90 as well as input signals from the speed sensor or sensors. A seed trajectory can be predicted based on the release point of the seed in the meter and the X location of the seed as it passes the sensor assembly 56. The trajectory, the height of the sensor assembly relative to the furrow and the ground speed of the planter unit are used to predict the seed spacing in the furrow. At a minimum, only the first sensor assembly 56 is needed to determine the X direction location of the seed and to predict the seed spacing. The use of the second sensor assembly 90 to determine the location in the Y direction can provide more accuracy to the seed spacing as it can better detect multiple seeds and predict bouncing of the seed caused by contact with the seed tube side walls 40.

Further accuracy in predicting the seed spacing is provided from use of acceleration data of the planter row unit from the accelerometer 35 at the time the seed is release from the meter. Down force data from the down force sensor 33 can also provide greater accuracy by providing a more accurate location of the seed tube relative to the furrow.

Figure 14:
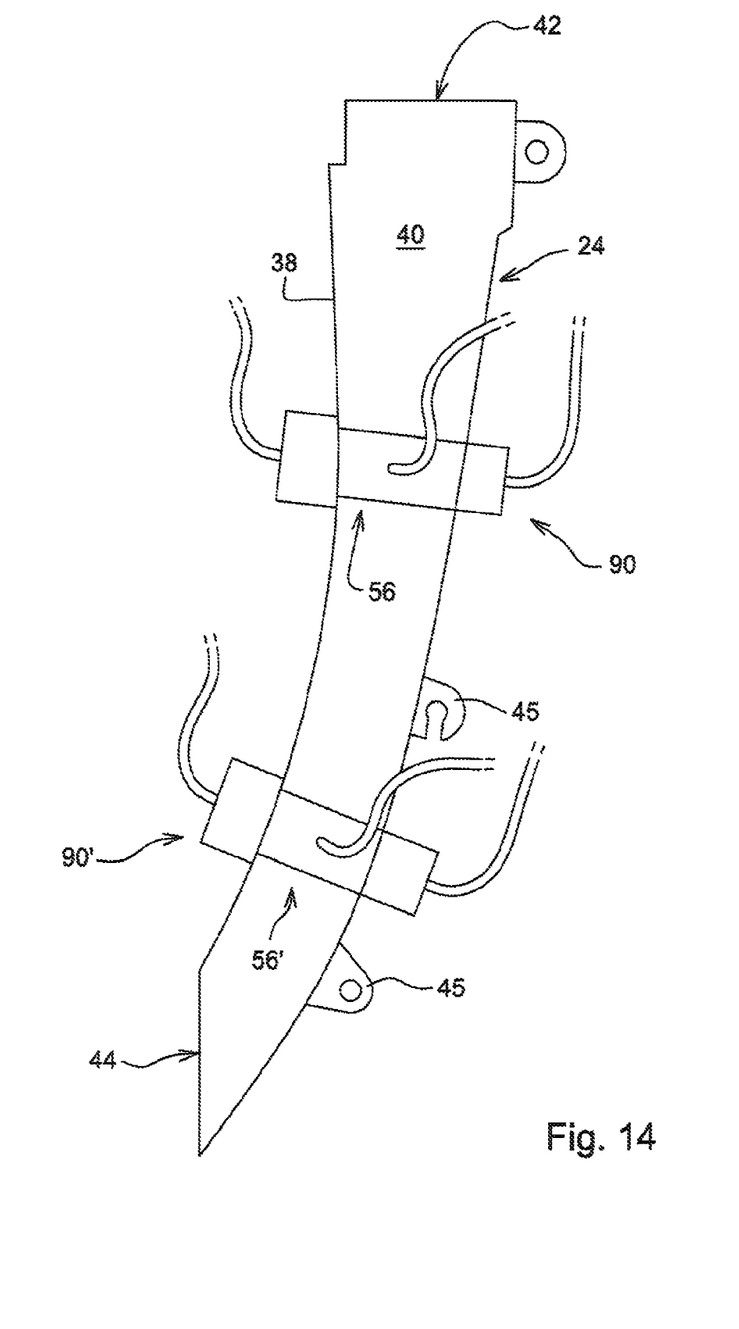
FIG. 14 is a side view of an alternative seed tube of the planting unit with two vertically spaced seed sensors of the present invention.

Determination of the seed trajectory can be made with even more precision with the use of two sets of sensor assemblies 56, 90 and 56', 90' as shown in FIG. 14. Here, sensor assemblies 56, 90 are vertically spaced above sensor assemblies 56', 90'. With two sets of sensor assemblies, the X and Y positions of seeds are determined at two locations along the length of the seed tube. Having X and Y location data at two points along the seed tube enables greater precision in determining the seed trajectory and thus the final seed spacing in the furrow.

While the radiation travels across the seed tube in the substantially the X and or Y directions as described above, there will likely be some radiation inclined to these axes. There is no particular threshold amount of inclined radiation that distinguishes between the sensor working and not working. There will only be degradation in the sensor accuracy with more inclined radiation leading to the point where the sensor is no longer providing useful information.

Figure 15:
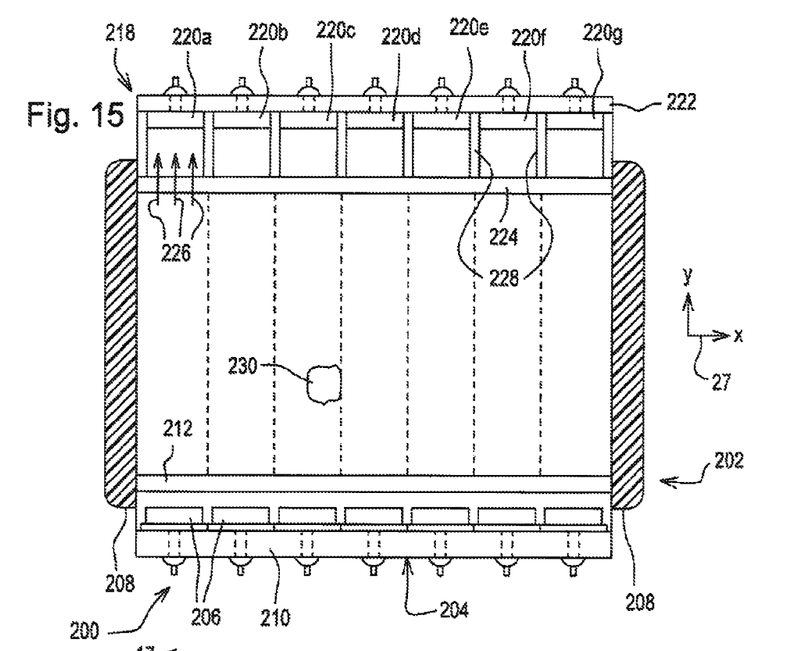
FIG. 15 is sectional view of the seed tube showing another embodiment of the sensor.

Yet another sensor is shown in FIG. 15 and designated as 200. Sensor 200 is shown in a seed tube 202. The sensor 200 includes a radiation emitter 204, shown as an array of light emitting diodes (LEDs) 206 on one wall 208 of the seed tube. The LEDs are mounted to a PC board 210 with conductive strips forming electrical connections with the LEDs 206 mounted thereon. The sensor further has a radiation detector 218 consisting of an array of detecting elements 220(a-g) on the opposite side of the seed tube from the transmitters 206. Again, the detecting elements can be photo-diodes or phototransistors or other detector capable of detecting the level of radiation from the emitter 204. The detecting elements 220 are also mounted on a PC board 222 with conductive strips forming electrical connections.

Positioned in front of the emitter 204 and preferably flush with the inner edge of the seed tube side wall is a diffuser 212. The diffuser 212 ensures that the radiation, e.g. light from the LEDs, has a uniform intensity across the width of the array of emitters. Having a uniform light intensity provides improved accuracy to the sensor as all detecting elements 220 receive the same amount of radiation when there are no seeds in the seed tube passing the sensor 200. With the diffuser 212, any number of LEDs 206 can be used in the radiation emitter 204 as long as a uniform intensity of light is produced across the seed tube.

Positioned in front of the detecting elements 220 is a lens 224 which directs the light emitted by the LEDs into parallel beams substantially in the Y-direction as shown by the arrows 226. One type of lens can be a privacy filter such as that made by the 3M Company and of the type described in U.S. Pat. No. 6,398,370. The detecting elements 220 are also set back from the seed tube and separated by from one another by dividing walls 228. The dividing walls 228 help to further prevent any radiation incident on the detecting elements that is not aligned in the Y-direction. The dividing walls 228 are optional. The lens 224 can be spaced from the detecting elements as shown in FIG. 15 or placed immediately before the detecting elements. While only a single lens 224 is shown on the side of the seed tube as the detecting elements, another lens to align the radiation in the Y-direction can be placed adjacent the diffuser 212 on the emitter side of the tube.

As described above, when a seed 230 falls through the seed tube between the radiation emitter 202 and the array of radiation detecting elements 220, there will be an interruption in the radiation incident upon one or more of the detecting elements 220. Also, as described above, a second sensor 200 can be placed in the other walls of the seed tube to determine both the X and Y location of the seed in the tube. Sensors 200 differ from those described above in the addition of a radiation diffuser 212 to produce uniform intensity of radiation across the sensor.

Figure 16:
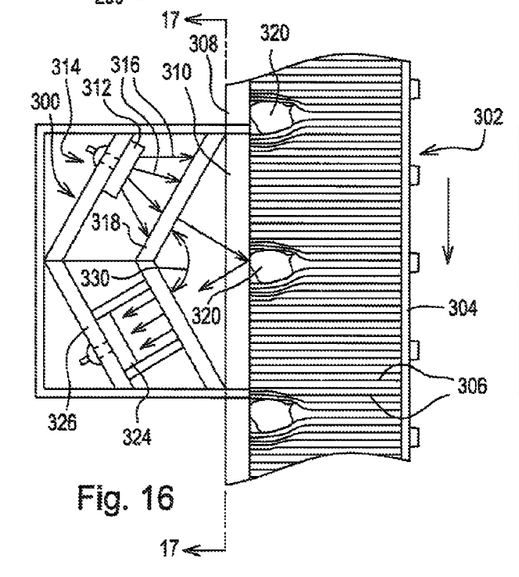
FIG. 16 is a sectional view of a reflective sensor on a seed tube having a mechanical seed delivery mechanism therein.
Figure 17:
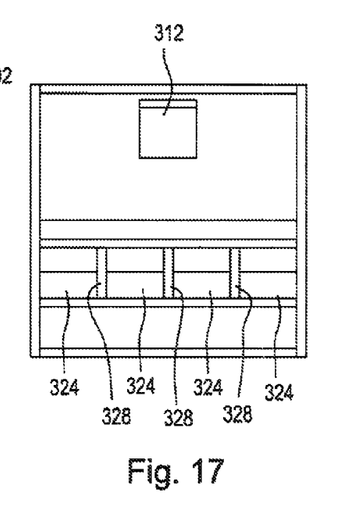
FIG. 17 is a front view of the sensor of FIG. 16 as seen from the line 17-17 of FIG. 16.

The above sensors are "transmissive" sensors in the sense that they "transmit" radiation across the seed tube. However, in some instances a reflective sensor is needed to detect seeds. Such an instance is when seed movement in the seed tube is not be gravity or air but by a mechanical structure such as the brush belt shown in US Patent Publication US2010/0192819 A1. There the seed is held in the bristles of a brush which prevents light from shining across the seed tube. A reflective sensor 300 is shown in FIGS. 16-17 to detect seeds traveling in the brush belt. The belt 302 has a base member 304 and a plurality of bristles 306. The belt operates in a housing having a wall 308. The sensor 300 is mounted in an opening in the housing wall 308 and includes a window 310 that fits in the opening in the wall 308 and through which radiation from and to the sensor passes.

The sensor 300 includes an emitter 312 mounted to a PC board 314 and electrically connected thereto. Radiation from the emitter is shown by the arrows 316 which is directed through a diffuser 318 that uniformly distributes the radiation to and through the window 310. Radiation impinges on and is reflected by the seed 320. Reflected radiation passes through lens 322 such as the 3M film mentioned above. The lens 322 aligns the radiation so that the radiation is perpendicular to the plane of the lens 322. After passing the filter, the radiation is detected by one of several detecting elements 324 of an array of detecting elements 324 mounted on a PC board 326.

FIG. 17 is a view looking into the sensor 300 from the line 17-17 of FIG. 16. There is only one emitter 312. More emitters 312 can be used if needed to provide enough uniform radiation through the diffuser 318. The sensor as shown has a total of four detecting elements 324 arranged in the array. By using a lens 322 to align the radiation received by the detecting elements 324, the location of the seeds and the number of individual seeds passing the sensor can be determined. To aid in this separation, the detecting elements 324 can be separated by dividing walls 328. Again, the dividing walls are optional. To operate as a reflective sensor, it is best if the emitter and the detecting elements are arranged at an angle 330 relative to one another. This angle 330 may be as small as 3-5 degrees and is shown exaggerated in FIG. 16. The angle 330 may be larger than 5 degrees if desired.

While the sensors have been shown and described as fitting into openings in the seed tubes, they may be placed on the outside of the tubes with the tubes, or a portion of the tubes, made of a material that is transparent or substantially transparent to the radiation. Such a tube and sensor combination is shown in U.S. Pat. No. 7,472,660.

The invention has been described in the context of a generally vertically oriented seed tube having front, rear and side walls. The designation of the walls as front, rear and side is only for convenience in describing the invention. The sensor assemblies can be used in a horizontal seed tube as well and an inclined seed tube. The labels front, rear and side applied to the walls shall be construed solely as a means of distinguishing between walls without regard to the actual orientation of the walls in physical space.

Having described the preferred embodiment, it will become apparent that various modifications can be made without departing from the scope as defined in the accompanying claims.

The invention claimed is:

1. A seed sensor assembly for detecting the passage of a seed through a seed tube, the seed tube having front and rear walls spaced apart in a travel direction and spaced side walls extending between the front and rear walls, the sensor assembly comprising:
   a first radiation emitter on one side wall of the seed tube;
   a first array of radiation detecting elements along the opposite side wall from the radiation emitter and extending from the front wall to the rear wall of the seed tube to determine a position of a seed passing the first array relative to the seed tube in the travel direction;
   a second radiation emitter on one side wall of the seed tube spaced from the first radiation emitter in a direction of seed travel through the tube; and
   a second array of radiation detecting elements along the opposite side wall from the second radiation emitter and extending from the front wall to the rear wall of the seed tube and spaced from the first array of radiation detecting elements in the direction of seed travel through the tube to determine a position of a seed passing the second array relative to the seed tube in the travel direction.

2. The seed sensor assembly specified in claim 1 further comprising:
   a third radiation emitter on one of the front or rear walls of the seed tube at substantially the same plane as the first radiation emitter;
   a third array of radiation detecting elements along the other of the front or rear walls of the seed tube from the third radiation emitter and extending from the opposite side walls of the seed tube
   whereby the location of the seed between the side walls of the seed tube is determined by which detecting elements of the third array of radiation detecting elements have an interruption in the radiation incident thereon caused by the passage of a seed between the third radiation emitter and the third array of radiation detecting elements.

3. A planter and seed monitor assembly comprising:
   a frame adapted for movement over a field along an X-direction with a Y-direction extending transverse to the X-direction and a Z-direction extending upwardly normal to the X and Y directions; and
   multiple row units mounted on the frame, each row unit having:

a metering device for dispensing seed at a predetermined rate;

a seed a tube having a front wall and a rear wall which are spaced apart along the X-direction and which are joined together by two sidewalls spaced apart along the Y-direction, the tube having an open top for receiving seed and an open bottom for depositing seed;

a first sensor assembly for seed passing through the seed tube having a first radiation emitter and a first array of radiation detecting elements along the other side wall from the radiation emitter and extending from the front wall to the rear wall of the seed tube; and a second sensor assembly for seed passing through the seed tube spaced in the Z-direction from the first sensor assembly, the second sensor assembly having a second radiation emitter and a second array of radiation detecting elements along the other side wall from the radiation emitter and extending from the front wall to the rear wall of the seed tube.

4. The planter as specified in claim 3 further comprising speed sensing means for determining the speed at which the planter is moving in the X-direction.

5. The planter as specified in claim 4 wherein the speed sensing means includes a pair of sensors mounted to the frame for detecting different travel speeds at different locations on the frame as the planter follows a curved path.

6. The planter as specified in claim 3 further comprising a linkage coupling each row unit to the frame enabling vertical movement of the row unit relative to the frame, a mechanism for generating a downward directed force on each row unit and a down force sensor for measuring the amount of down force applied to at least one row unit.

7. The planter as specified in claim 3 further comprising a linkage coupling each row unit to the frame enabling vertical movement of the row unit relative to the frame and an accelerometer to measure the acceleration of the row unit.

8. A method of predicting seed spacing in a furrow when planted by a seeding machine having a row unit with a seed meter, a furrow opener and a seed tube through which seed passes to the furrow upon release from the seed meter at a known seed release point, the method comprising, sensing the passing of a seed in the tube with a first seed sensor;

determining the position of the seed relative to the tube in at least a direction of travel of the seeding machine as the seed passes the first seed sensor;

sensing a travel speed of the seeding machine; and using the known seed release point, the position of the seed in the seed tube in the direction of travel of the seeding machine at the seed sensor and the machine travel speed, calculate a predicted seed location in the furrow.

9. The method as defined in claim 8 further comprising the step of determining the position of the seed relative to the tube in a direction perpendicular to the direction of travel.

10. The method as defined in claim 8 wherein the step of determining the position of the seed relative to the tube in the direction of travel is performed by an array of radiation detectors, each responsive to the passing of seed at a given position relative to the tube in the direction of travel.

11. The method as defined in claim 8 further comprising the step of sensing acceleration of the row unit at the time seed is released from the seed meter and using the acceleration is calculating the predicted seed location in the furrow.

12. The method as defined in claim 8 further comprising the steps of:

providing a second seed sensor in the seed tube at a location between the first seed sensor and the furrow;

detecting the passing of a seed past the second seed sensor;

determining the position of the seed relative to the tube in at least the direction of travel of the seeding machine as the seed passes the second seed sensor;

using the position of the seed in the travel direction as the seed passes the first and second sensors to calculate a predicted seed location in the furrow.

* * * * *